(12) United States Patent
Watanabe et al.

(10) Patent No.: US 10,283,016 B2
(45) Date of Patent: May 7, 2019

(54) THORACIC CAVITY SIMULATOR

(71) Applicants: FASOTEC CO., LTD., Mihama-ku, Chiba-shi, Chiba (JP); Toshiaki Morikawa, Kobe-shi, Hyogo (JP)

(72) Inventors: Kinichi Watanabe, Chiba (JP); Takeshi Anraku, Chiba (JP); Toshiaki Morikawa, Tokyo (JP)

(73) Assignee: Fasotec Co. Ltd., Chiba (JP)

( * ) Notice: Subject to any disclaimer, the term of this patent is extended or adjusted under 35 U.S.C. 154(b) by 286 days.

(21) Appl. No.: 15/129,985

(22) PCT Filed: Mar. 30, 2015

(86) PCT No.: PCT/JP2015/001842
§ 371 (c)(1),
(2) Date: Sep. 28, 2016

(87) PCT Pub. No.: WO2015/151503
PCT Pub. Date: Oct. 8, 2015

(65) Prior Publication Data
US 2017/0140674 A1    May 18, 2017

(30) Foreign Application Priority Data
Mar. 31, 2014 (JP) .................. 2014-072653

(51) Int. Cl.
G09B 23/28 (2006.01)
G09B 23/34 (2006.01)
G09B 9/00 (2006.01)

(52) U.S. Cl.
CPC .............. G09B 23/34 (2013.01); G09B 9/00 (2013.01); G09B 23/285 (2013.01)

(58) Field of Classification Search
USPC .................. 434/262, 265, 267, 272, 274
See application file for complete search history.

(56) References Cited

U.S. PATENT DOCUMENTS 2,678,505 A    5/1954   Munson
4,773,865 A *  9/1988   Baldwin ............... G09B 23/30
                                                     434/267

(Continued)

FOREIGN PATENT DOCUMENTS

| JP | 2010-085512 A | 4/2010 |
| JP | 2011-203699 A | 10/2011 |
| JP | 2013-190604 A | 9/2013 |

OTHER PUBLICATIONS

International Search Report, PCT/JP2015/001842, dated Jun. 16, 2015.

*Primary Examiner* — Kurt Fernstrom
(74) *Attorney, Agent, or Firm* — Ogilvie Law Firm

(57) ABSTRACT

Provided is a thoracic cavity simulator that, for the purpose of training or education in thoracic cavity microscopic surgery, faithfully reproduces the shape and feel of a human body and that can simulate a surgical environment for a human body that has multiple constraints. A device that comprises a model human skeleton that simulates at least ribs, and comprises a casing that houses the model human skeleton, the device being configured such that an opening is provided to a rib section of the casing, such that a diaphragm section can be opened and closed, and such that model organs can be housed inside the ribs of the model human skeleton. The diaphragm section is configured so as to be removable and/or openable and closable, and the model organs housed inside the ribs of the model human skeleton are replaced.

8 Claims, 10 Drawing Sheets

(56) References Cited

U.S. PATENT DOCUMENTS

| | | | | |
|---|---|---|---|---|
| 5,061,188 A * | 10/1991 | McCollum | G09B 23/285 | 434/265 |
| 5,356,295 A * | 10/1994 | Grosz | G09B 23/30 | 428/100 |
| 5,374,194 A * | 12/1994 | Walcerz | G09B 23/288 | 434/265 |
| 6,206,703 B1 * | 3/2001 | O'Bannon | G01M 17/0078 | 434/267 |
| 6,234,804 B1 * | 5/2001 | Yong | G09B 23/285 | 434/267 |
| 8,535,061 B2 * | 9/2013 | Boutchko | A61B 5/416 | 434/262 |
| 8,840,403 B2 * | 9/2014 | Segall | G09B 23/28 | 434/272 |
| 9,953,548 B2 * | 4/2018 | Fradette | G09B 23/288 | |
| 2004/0126746 A1 | 7/2004 | Toly | | |
| 2005/0214727 A1 | 9/2005 | Stoianovici et al. | | |
| 2014/0329217 A1 * | 11/2014 | Barsness | G09B 23/306 | 434/272 |
| 2016/0078784 A1 * | 3/2016 | Sullenberger | G09B 23/34 | 434/272 |

\* cited by examiner

THORACIC CAVITY SIMULATOR

TECHNICAL FIELD

This invention relates to a thoracic cavity simulator for training and learning of a laparoscopic surgery.

BACKGROUND ART

Needs for 3-Dimensional Visualization of the affected part and the specific part of a body in the medial field are increased in the fields of medical treatment policy decision, medical education, medical research and so on. Especially, in the case of three-dimensional visualization utilizing a three dimensional shaping model, much information that cannot be sufficiently transferred by computer images can be transferred not only by vision but also by actually touching the stereoscopic shape by hand.

In recent years, three dimensional printers capable of producing three dimensional molding models using resins of different mechanical properties based on combination of hard resins and soft resins based on simultaneous injection of plural types of resins are known and consequently surfaces and even inner structures regarding the shape structure can now be reproduced.

Also, an endermic technique simulator that makes leaning of a high level medical technique possible even in those cases wherein there lacks clinical experiences through trainings sensuously simulating actual medical techniques regarding those in medical fields such as incision and skin stitching is known. (Refer to patent literature 1, for example)

The endermic technique simulator disclosed in the patent literature 1 consists of a main body having a convex curved surface, a mounting part for mounting a trachea (a human organ substitute), a skin fixing part for fixing skin (a human skin substitute) to the main body in a manner to cover a part of the trachea and a mounting part displacement mechanism for sliding the mounting part in the direction perpendicular to the convex curved surface.

By using this endermic technique simulator, a configuration wherein skin covers a trachea in a similar manner as a human body configuration wherein skin covers human organs is realized. Also, the curved surface becomes a substitute for a human body surface. By approximating the shape, configuration, hardness, texture and so on of the substitute to a human body, a simulation similar to an actual medical technique can be performed.

Currently, it is an actual state that a thoracic cavity simulator capable of closely reproducing a human body type and its texture and simulating a surgical environment on human body with a lot of constraints for the purpose of training and learning of the thoracoscopic operation is not found.

PRIOR ART

Patent Literature

[Patent literature 1] JP 2010-085512 A

OUTLINE OF THE INVENTION

Problems to be Solved by the Invention

In view of such circumstances, the present invention aims to provide a thoracic cavity simulator capable of closely reproducing a human body type and its texture and simulating a surgical environment on human body with a lot of constraints for the purpose of training and learning of the thoracoscopic operation.

Means to Solve the Objects

In the aim to solve the above mentioned problem, the thoracic cavity simulator according to the present invention consists of at least a human skeleton model simulating a rib and a casing for storing a human skeleton model, with a configuration wherein an opening being furnished at the rib portion of the casing, the diaphragm portion having capability of opening/closing and an internal organ model being storable within the rib of a human skeleton model. The thoracic cavity and the abdominal cavity in the human body are divided into thoracic viscera and abdominal viscera with a diaphragm being boundary and the internal organ model mentioned above becomes a lung, a heart, an esophagus and a trachea.

Internal organ models inside the rib of a human skeleton model are approximated to a human body regarding the items such as the shape and configuration of the surface and the interior, and hardness, texture and so on. A real operation environment is reproduced by the internal organ models with lungs and bronchial tubes of softness close to the actual texture and with pulses, reproducing textures such as softness.

Also, the human ribs consist of the first rib to the twelfth rib and the human skeleton model is reproduced as closely as possible. The casing corresponds to subcutaneous tissues and skin. Hardness and texture can be approximated to those of a human body while the casing itself can be made of a hard resin.

By disposing an opening at the rib portion of the casing, surgical instruments to be employed in a thoracoscopic operation such as forceps can be inserted inside the ribs through a gap between the ribs. The diaphragm portion has an opening/closing structure to be detachable and the internal organ models to be stored in the rib of the human skeleton model can be exchanged.

The human skeleton model in the thoracic cavity simulator according to the present invention consists of the ribs, the breastbone, the spine and the shoulder blade, with an opening for exposing at least from the 3rd rib to the 6th rib being disposed on either one of the left or right side or both sides when the breastbone side is supposed to be the front and the spine side is supposed to be the back, and the bottom cover with a convex part simulating the diaphragm is preferably detachable.

The human skeleton model consists of the breastbone, the ribs, the breastbone, the spine and the shoulder blade, and the reason that an opening for exposing at least from the 3rd rib to the 6th rib is disposed on either one of the left or right side or both sides is to more closely simulate the operation environment for the human body with many constraints. In the case of an operation on internal organs inside the thoracic cavity, accessing from the breastbone, the spine and the shoulder blade is not frequent and accessing from the gap between the ribs is most frequent.

Due to this fact, openings are disposed on the left and right sides. Also, although the human ribs consist of the 1st rib through the 12th rib, accessing through the gaps between the 3rd rib through the 6th rib is most frequent and an opening is disposed at the portion that exposes the 3rd rib through the 6th rib.

Also, the internal organ model inside the thoracic internal organs can be exchanged by making the bottom cover with a convex part simulating the diaphragm is preferably detachable.

Also, the thoracic cavity simulator according to the present invention is furnished with a gripping member with sliding capability along the spine or the breastbone of the human skeleton model and the internal organ model is attached to the gripping member and the internal model can be preferably stored inside the rib of the human skeleton model by sliding and storing the gripping member. The spine and the breastbone of the human skeleton model are bones that extend straight and the gripping member is slid along the spine or the breast bone by using these bones as slide rails in spite of the fact that they are slightly uneven.

The gripping member is configured in such a way that the internal organ model can be attached thereto and the internal organ model is stored inside the ribs by sliding the gripping member into the inside of the ribs of the human skeleton model.

By employing a gripping member storable by sliding inside the ribs of the human skeleton model, convenience for the placement, fixation and exchange of the internal organ model can be improved. By exchanging the internal organs inside the thoracic cavity such as lungs, the thoracic cavity simulation system here can be used repeatedly and the surgical operation same as the actual operation can be performed by using actual surgical machineries. By changing the internal organs to be stored, it becomes possible to cope with wide variety of medical techniques.

Also, it is preferable that the thoracic cavity simulator according to the present invention is furnished with a lid member for covering the opening portion, and a through hole through which surgical instruments for medical techniques under thoracic cavity are inserted is provided on the lid member. Because the surgical implements such as forceps used in the thoracoscopic operation are apparatus to be inserted through holes of small radius, an operation environment under thoracoscopic operation is reproduced with reality by opening a small-diameter hole at the lid member.

Here, the casing and the lid member are preferably made of a light-transmitting material. Basically, the thoracoscopic surgical operation is performed by observing the object under laparoscope. However, due to the fact that the objectives in this case are trainings and learnings, the casing is purposely made to be transparent or semi-transparent so that the position of ribs, the position of lungs and the heart which are internal organs in a thoracic cavity and the position of forceps used in the surgery under peritonescope operation are confirmed.

Training of the thoracoscopic surgery can be performed for beginners of the thoracoscopic surgery under by comparing the views between the ones from the outside and the inside of the thoracic cavity, while it also can be performed for advanced learners by hiding the inside by a lid member. It is expected for the users of the thoracic cavity simulator according to the present invention to be useful in understanding and having an actual feeling of the distance and grasping of the actual sizes under the thoracoscopic surgery.

Also, in the ribs of the human skeleton model, it is preferable that the part corresponding to the soft ribs is made of a soft material so that the gap between the neighboring ribs can be widened. Surgical implement such as forceps used in the thoracoscopic surgery is inserted from the gap between the ribs. In the case of the ribs of an actual human being, it is possible to widen the gap of the ribs to some extent by rib cartilage and therefore the gaps between the neighboring ribs are arranged to be widened by employing a soft material for the portion corresponding to the soft ribs.

The human internal organ model in the thoracic cavity simulator according to the present invention is the biological texture internal organ model and the biological texture internal organ model is preferably compressible/expandable, furnished with a mean to change the model size. The changeability of the model size of the biological texture internal organ model makes it possible to train the medical techniques for the lung and heart models with the movement such as pulses.

Here, the biological texture internal organ model is aimed at obtaining practical medical techniques by improving the sense of reality using soft materials approximated to the actual texture. The biological texture internal organ model here is a three dimensional molding model produced based on the three dimensional shape data generated by using DICOM (Digital Imaging and Communications in Medicine) data obtained from medical diagnostic apparatuses such as X-ray CT, MRI (Magnetic Resonance Imaging) and so on, further being a 3 dimensional molded object of living body internal organs having textures (visualization, feeling, hardness, softness and so on) of each body part (bone, internal organ and so on). With regard to the production method of the living body texture internal organ model is publicized in the international publication pamphlets (WO2012/132463).

The internal organ model in the thoracic cavity simulator according to the present invention is a biological texture internal organ model. It is preferable that the biological texture internal organ model is furnished with tubes simulating blood vessels on the model surface or the vicinity of the model with a mean for a liquid to flow out when said tube breaks. According to such a structure, it becomes possible to simulate a case wherein bleeding occurs during an operation, and to train handing methods in such a case.

Moreover, it is preferable that the biological internal organ images are projected by mapping on the inner wall of the casing and the lid member in the thoracic cavity simulator according to this invention. By having the biological internal organ images projected by mapping on the inner wall of the casing, the training can be performed with images with more vivid feeling of presence. Also, in the thoracic cavity simulator according to the present invention, the biological organ texture model is preferably a reproduction of a three dimensional structure inside the internal organ. By reproducing the three dimensional structure inside the internal organ, a training with reality can be performed at the time of excision operation in the training of medical technique.

Effects of the Invention

According to the thoracic cavity simulator of the present invention, there are effects such as that the human body shape and texture can be faithfully reproduced and that the operation environment for the human body with a lot of constraints can be simulated, as the training and learning materials of the thoracoscopic surgery.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

[Embodiment 1]

Figure 1:
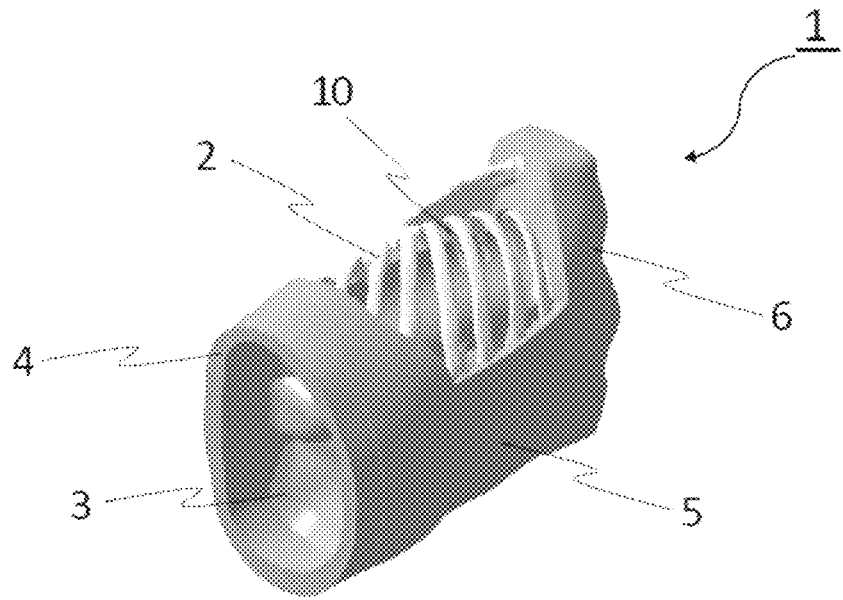
FIG. 1 An external view of the thoracic cavity simulator of Embodiment 1
Figure 2:
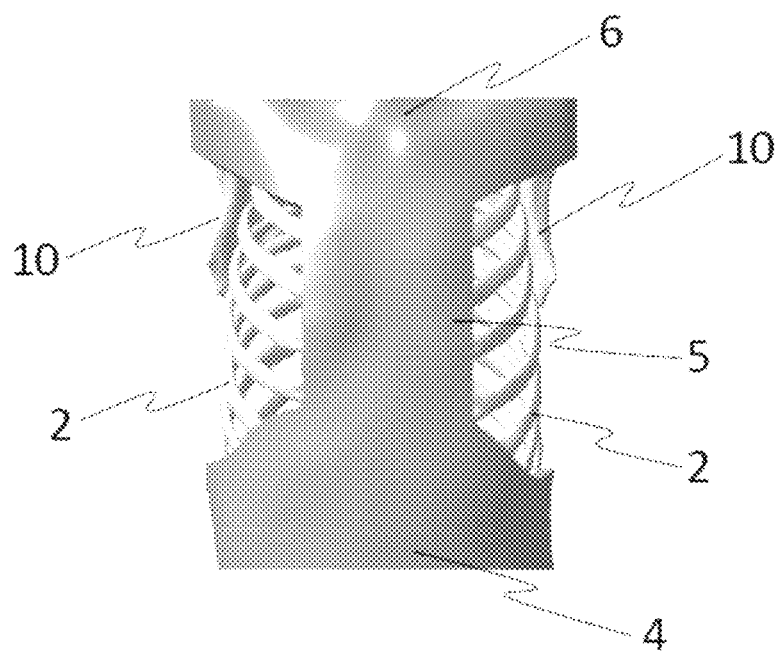
FIG. 2 A font view of the thoracic cavity simulator of Embodiment 1
Figure 3:
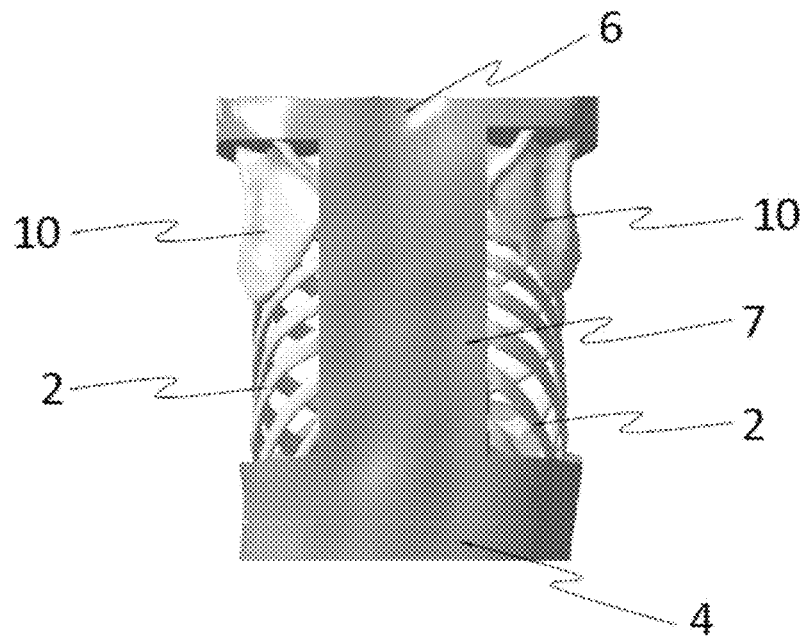
FIG. 3 A rear view of the thoracic cavity simulator of Embodiment 1
Figure 4:
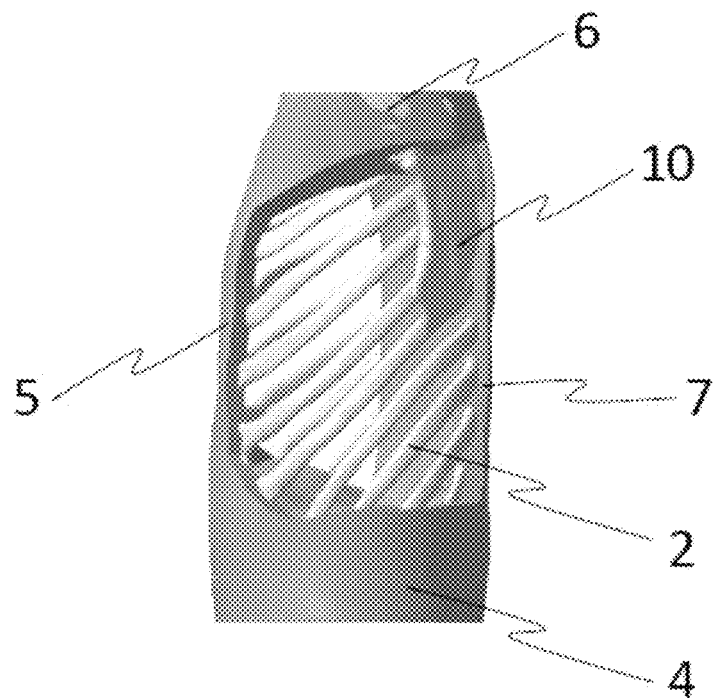
FIG. 4 A right side view of the thoracic cavity simulator of Embodiment 1
Figure 5:
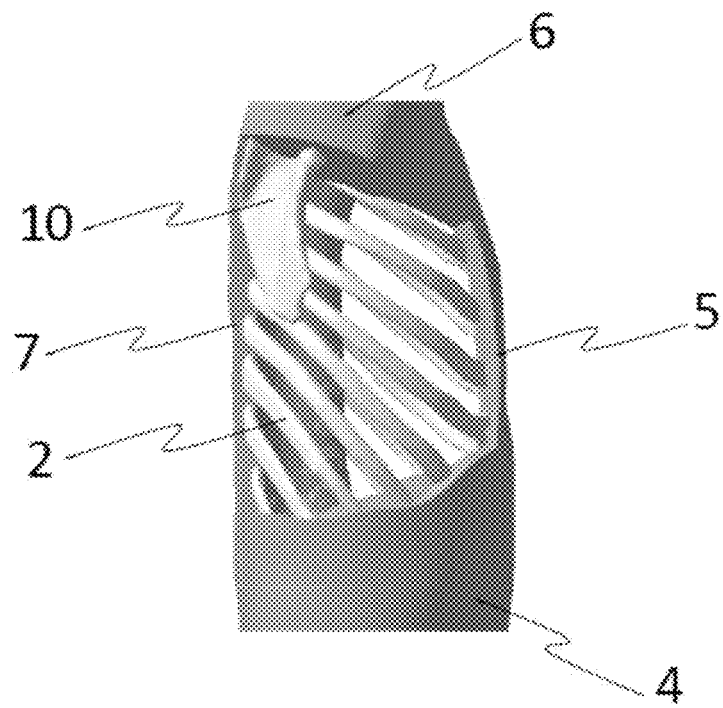
FIG. 5 A left side view of the thoracic cavity simulator of Embodiment 1
Figure 6:
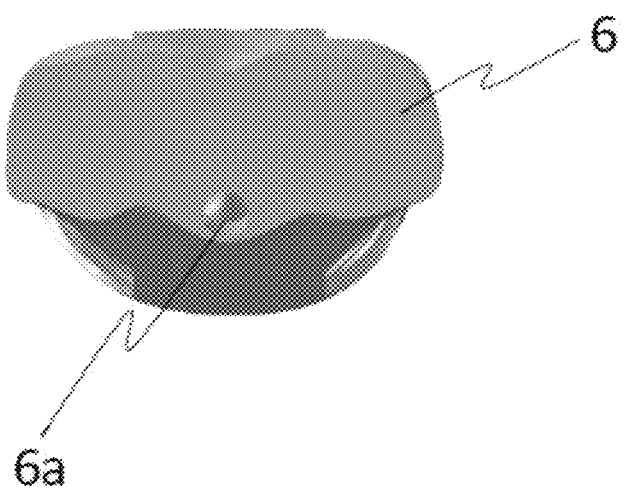
FIG. 6 A plan view of the thoracic cavity simulator of Embodiment 1
Figure 7:
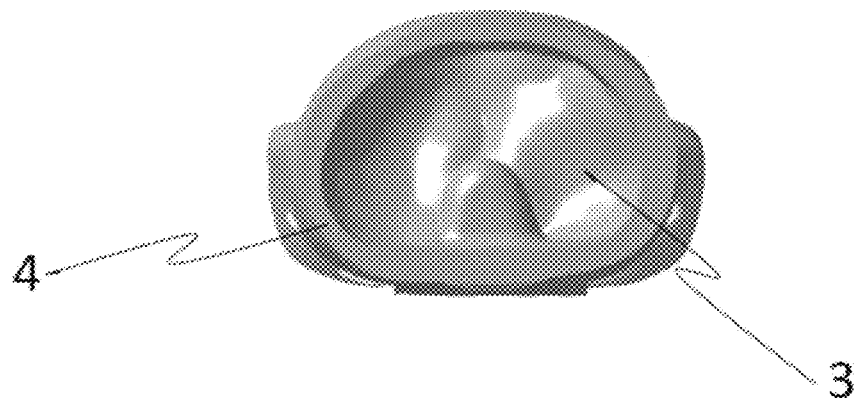
FIG. 7 A bottom view of the thoracic cavity simulator of Embodiment 1

FIG. 1 shows the external view of the thoracic cavity simulator 1. FIG. 2 through FIG. 7 show a front view, back view, left side-view, right side-view, top view and bottom view, of the thoracic cavity simulator 1.

The thoracic cavity simulator 1 consists of a human skeleton model simulating a rib 2, a breastbone, a spine and a shoulder blade 10 and casings (4, 5 and 6) for storing the human body skeleton model. An opening portion is disposed at the rib portion of the casing. The bottom lid 4 having a protrusion portion simulating a diaphragm 3 is detachable from the casing, having capability of opening and closing at the diaphragm portion and thus internal organ models such as the lung and the heart can be stored in the ribs of the human skeleton model. The opening portion at the rib portion of the casing exposes the second rib through 8th rib and openings are disposed at each left and right side.

The breastbone of the human skeleton model is hidden inside the casing front portion 5. Also, the spine of the human skeleton model is hidden inside the casing rear portion 7.

Note that FIGS. 2-7 represent states of the internal organ model not stored inside the ribs of the human skeleton model. Also, the rib portion 6a exists at the casing upper (flat) portion 6.

Figure 8:
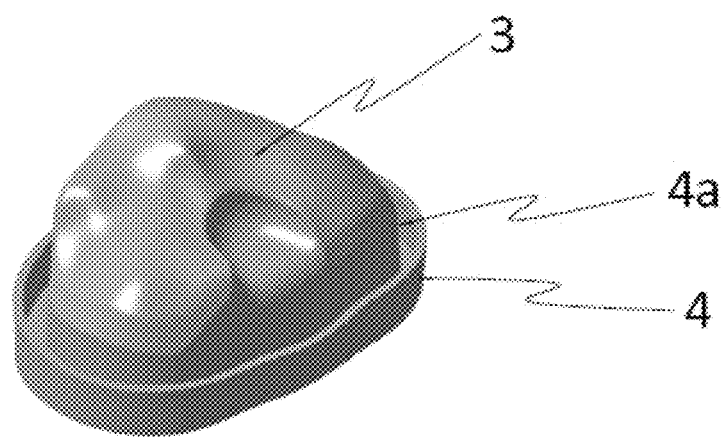
FIG. 8 A perspective view of the bottom lid of the thoracic cavity simulator of Embodiment 1

FIG. 8 shows a perspective view of the bottom lid portion 4 of the thoracic cavity simulator 1. A protrusion simulating the diaphragm 3 is formed at the bottom lid 4, and the thoracic cavity volume inside the thoracic cavity simulator 1 is restrained in such a way that the actual environment inside the thoracic cavity is reproduced. A recess part 4a is formed at the periphery of the bottom lid portion 4 allowing engaging with the casing body.

Figure 9:
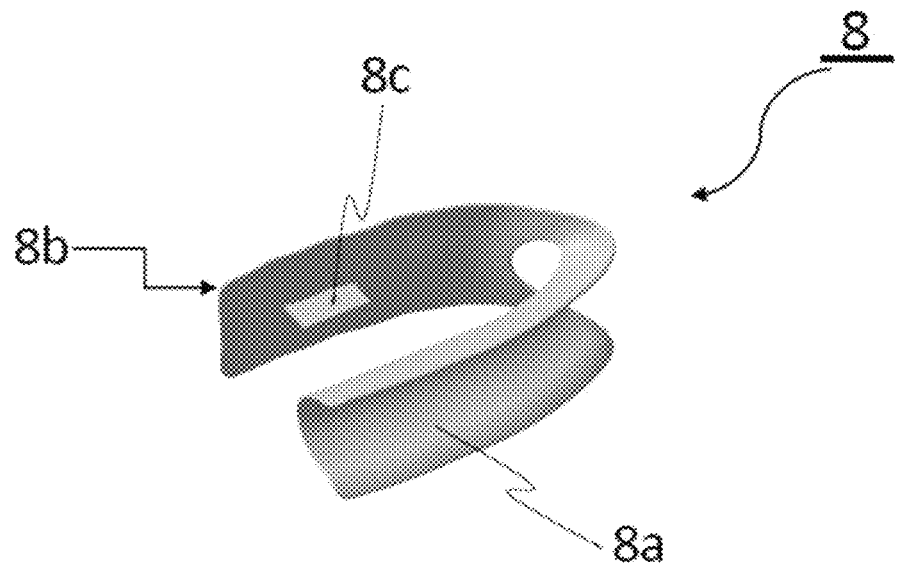
FIG. 9 An external view of the gripping member of the thoracic cavity simulator of Embodiment 1

FIG. 9 shows the outside drawing of the gripping member 8 of the thoracic cavity simulator 1. Recess portions (8a and 8b) for becoming receiving portions of the spine and the ribs are formed so that the gripping member 8 can slide along the spine and the breastbone of the human skeleton model. Also, the engaging portion 8c is formed at the gripping member 8 so that the internal organ model can be attached. By storing the gripping member 8 by sliding toward the inside of the ribs of the human skeleton model, the internal organ model can be stored inside the ribs easily and placement, fixation and exchange of the internal organ model become easy.

Figure 10:
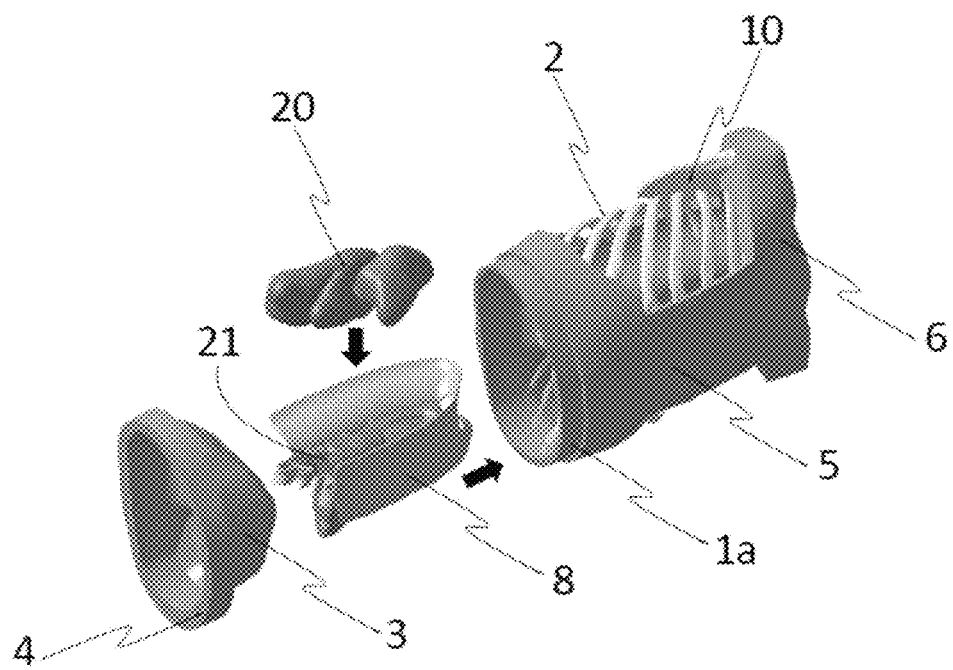
FIG. 10 An explanatory view 1 of the thoracic cavity simulator of Embodiment 1

As is shown in FIG. 10, internal organs model (20 and 21) such as the lung and the heart are attached by fixation to the gripping member 8 and then the gripping member 8 is slid along the spine and the breast bone so that the internal organ model is stored inside the ribs within the casing. And the thoracic cavity is built by attaching the bottom lid 4 having protrusion simulating the ribs 3 to the casing.

Figure 11:
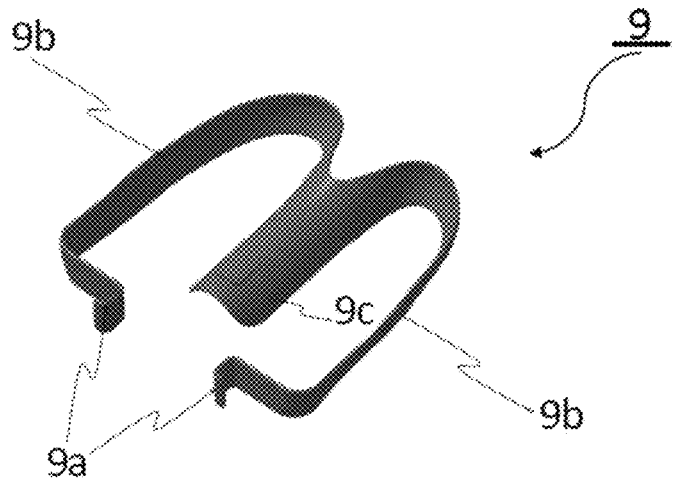
FIG. 11 An external view of the other of the gripping member of the thoracic cavity simulator of Embodiment 1

FIG. 11 shows the sketch drawing of the other gripping member 9 of the thoracic cavity simulator 1. The gripping member 9 is furnished with a recess 9c to become a receiving portion of the spine to be able to slide along the ribs 11. Arms (9b and 9c) are arranged on both left and right sides of the receiving portion of the spine. The width of opening between the left and the right can be adjusted by the end part 9a of the aim (9b and 9c), which stabilizes the posture of the gripping member 9 inside the ribs 2.

Figure 12:
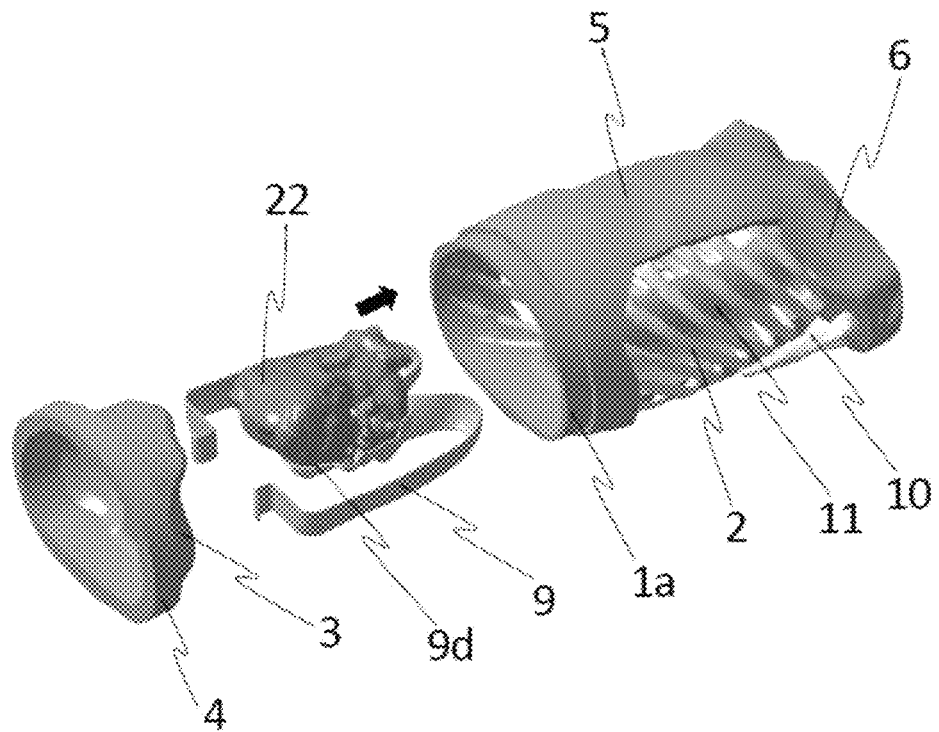
FIG. 12 An explanatory view 2 of the thoracic cavity simulator of Embodiment 1

As is shown in FIG. 12, the internal organ model is stored inside the ribs 2 in the casing, by placing the internal organ model 22 such as the lung and the heart on the plate portion 9d of the gripping member 9, which is slid along the spine 11. And thus the thoracic cavity space is built by attaching the bottom lid portion 4 having the protruding part simulating the diaphragm 3 to the casing.

Figure 13:
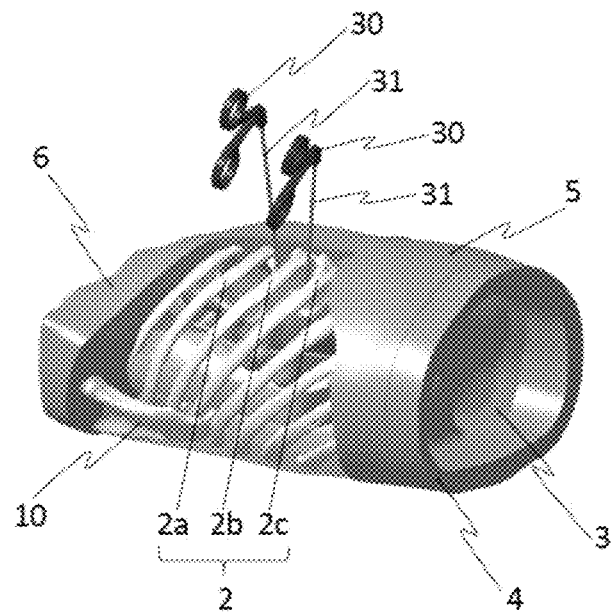
FIG. 13 An explanatory view 1 of the surgical environment of the thoracic cavity simulator of Embodiment 1
Figure 14:
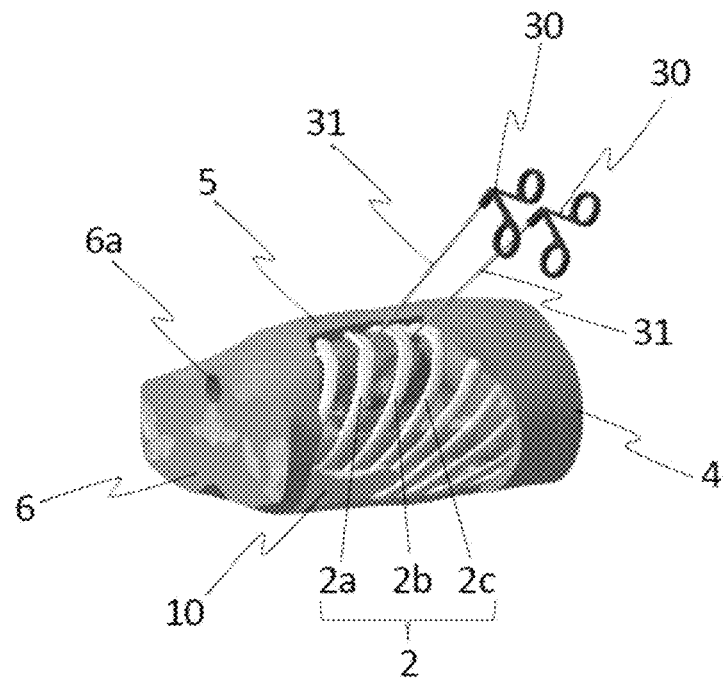
FIG. 14 An explanatory view 2 of the surgical environment of the thoracic cavity simulator of Embodiment 1

FIG. 13 and FIG. 14 show the situation of thoracoscopic surgery environment by using the thoracic cavity simulator 1. These figures show the training situation of thoracoscopic surgery of thoracic cavity internal organs using the forceps handle 30 by inserting forceps 31 through each gap between the 3rd rib 2a and the 4th rib 2b, and the 4th rib 2b and 5th rib 2c.

Figure 15:
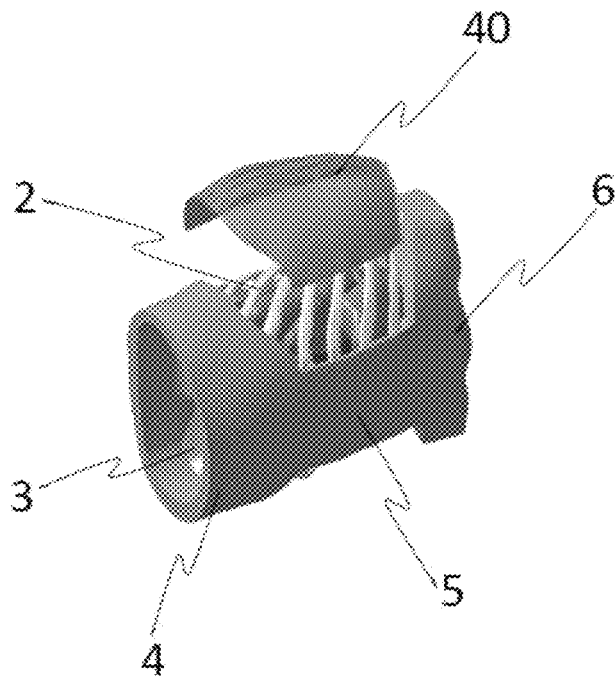
FIG. 15 A mounting view of the lid of the thoracic cavity simulator of Embodiment 1
Figure 16:
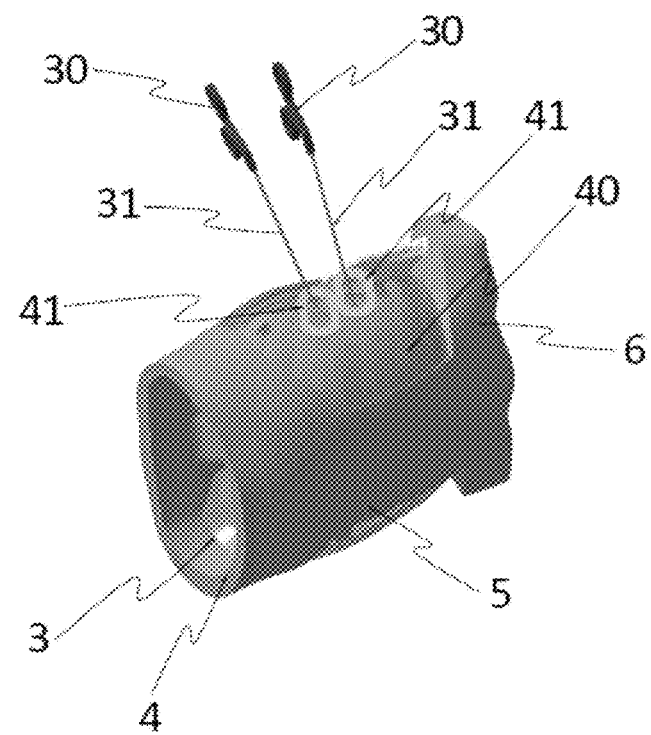
FIG. 16 An explanatory view of the surgical environment in the attachment the lid of the thoracic cavity simulator of Embodiment 1

FIG. 15 shows the installment situation of the lid member 40 in the thoracic cavity simulator 1. The lid 40 is a member for covering the opening portion at the side of the thoracic cavity simulator. As is shown in FIG. 16, a through hole 41 is arranged where a forceps to be used in the thoracoscopic technique can be inserted at the lid portion 40 and the forceps 31 is inserted and the training of thoracoscopic surgery on organs in thoracic cavity can be performed using the forceps handle 30.

The casing front portion 5, the casing rear portion 7, the casing side portion and the lid portion 40 of the thoracic cavity simulator 1 are semitransparent. As was mentioned above, the thoracoscopic surgery advances its technical process under observation of thoracic cavity using a camera. However, the objective here is training and learning, thus the casing is made to be semitransparent so that the position of the ribs, the positions of the lung and the heart which are thoracic cavity internal organs and the position of the forceps used in the thoracoscopic surgery can be confirmed.

Also, in the ribs of the human skeleton model of the thoracic cavity simulator 1, a soft resin is used at the part corresponding to costal cartilage so that the neighboring gaps of the ribs are widened. This is aimed at reproduction of the operation environment with reality approximating the accrual human ribs, because the forceps used at the thoracoscopic operation is inserted through a gap of the ribs.

Note that the internal organ model contained inside the ribs 2 of the thoracic cavity simulator 1 is approximated to the human body from the aspects of shapes and configuration of the surface and the inside, and further hardness, texture and so on, by using materials and technologies already known. A real operation environment is recreated by reproducing the texture such as softness based on the internal organ model with softness near to actual texture.

(Other Embodiments)

(1) The size and the position of the opening part of the casing in the thoracic cavity simulator 1 are not particularly limited as long as the rib portion is exposed. The casing can be the one that exposes the breastbone and the spine in addition to the opening portion that exposes the rib portion.

(2) With regard to the shape of the casing according to the thoracic cavity simulator 1, the one that approximates the actual human body is preferable, however, the one that possesses not only the abdominal portion but the arm portion, the head portion and further the abdominal cavity portion like the casing of thoracic cavity simulator 1 in embodiment 1 is acceptable.

Figure 17:
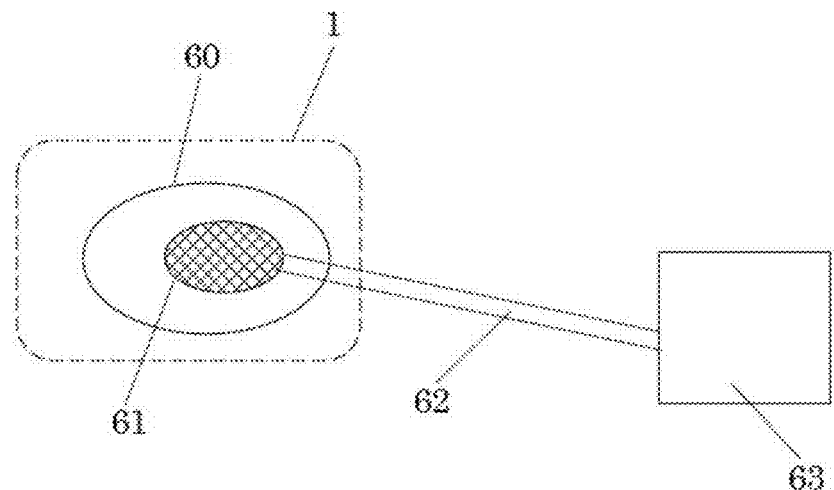
FIG. 17 An explanatory view (1) of other Embodiment

(3) A configuration that allows the biological texture internal organ model to linearly expand is shown in FIG. 17. The biological texture internal organ model 60 is produced using an extensible resin material and a cavity part 61 is furnished inside thereof. The biological texture internal organ model 60 expands and the model size becomes larger by the air ventilated from the air ventilation unit 63 outside of the thoracic cavity simulator 1 through the tube 62. On the other hand, the biological texture internal organ model 60 is reduced and the model size becomes smaller by releasing air from the cavity 61 through the tube 62 from outside of the thoracic cavity simulator 1. By this, the pulse of the heart, for example, can be reproduced, performing training of the medical technique with reality.

Figure 18:
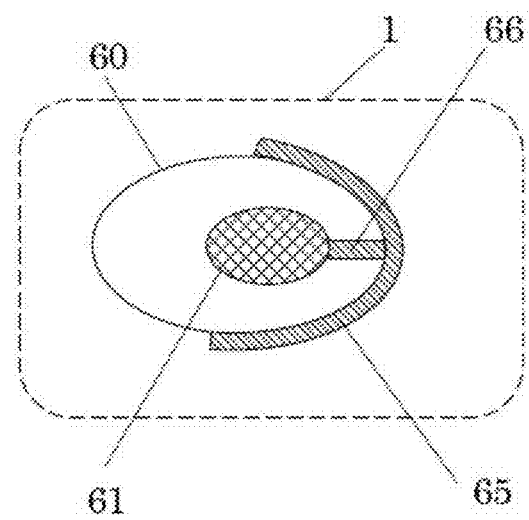
FIG. 18 An explanatory view (2) of other Embodiment
Figure 19:
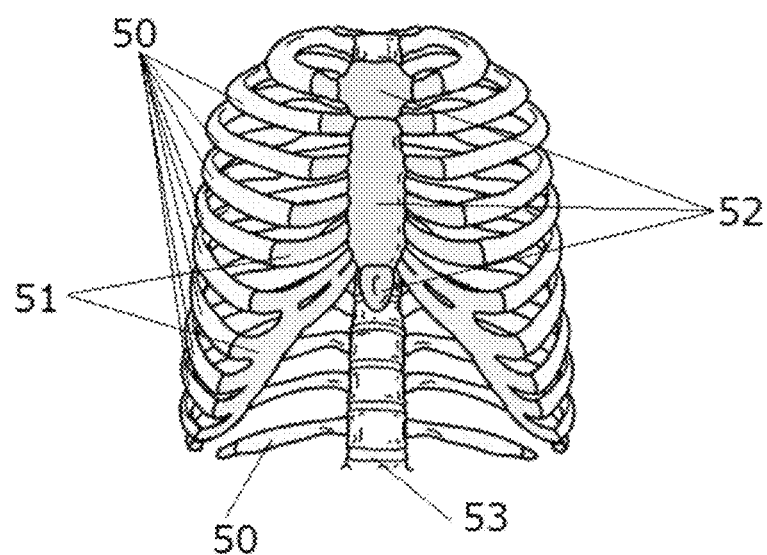
FIG. 19 An view showing the human body skeleton model of the ribs and sternum

An image wherein the tube 65 simulating a blood vessel is furnished around the surface of the biological texture internal organ model 60 or the vicinity of the model is shown in FIG. 18. A cavity 61 is arranged inside the biological texture internal organ model 60 and filled with liquid. Tube 66 is connected with the cavity 61 and the liquid filled in the cavity 61 of the biological texture internal organ model 60 is arranged to flow out when the simulated blood vessels are broken. By using such a structure, a case wherein bleeding occurs during the operation can be simulated and the handling method of such cases can be trained.

INDUSTRIAL APPLICATION POSSIBILITY

The present invention is useful as a simulator for trainings and learnings of the laparoscopic operations and as a surgery support device and a surgery simulation device.

EXPLANATION OF SIGNS

1 Thoracic cavity simulator
2, 2a~2c Rib
3 Diaphragm
4 Bottom lid
5 Casing front portion
6 Casing upper portion
6a Rib portion
7 Casing rear portion
8, 9 Gripping member
10 Shoulder blade
11 Spine
20, 21, 22 Internal organ model
30 Forceps handle
31 Forceps
40 Lid
41 Through hole
50 Rib
51 Rib cartilage
52 Sternum
53 Spine
60 Biological texture internal organ model
61 Cavity part
62, 66 Tube
63 Air ventilation unit
65 Tube simulating a blood vessel

The invention claimed is:

1. A thoracic cavity simulator, comprising:
a human skeleton model simulating at least ribs;
a casing for storing said human skeleton model;
said human skeleton model comprising ribs, a breastbone, a spine and a shoulder blade;
an opening part for exposing at least the $3^{rd}$ rib through the $6^{th}$ rib being disposed at the left side or right side or at both sides in a case wherein the breast bone side is at the front and the spine side is at the back;
a detachable bottom lid portion having a protrusion simulating the diaphragm;
and an internal organ model which is storable inside a cavity formed with the ribs of said human skeleton model.

2. A thoracic cavity simulator as set forth in claim 1, further comprising:
a gripping member having sliding capability along the spine or the breastbone of said human skeleton model;
said internal organ model being attached to said gripping member;
said internal organ model being stored inside a cavity formed with the ribs of said internal organ model by storing said gripping member inside the cavity formed with ribs of said human skeleton model by slide storage.

3. A thoracic cavity simulator as set forth in claim 1, further comprising:
a lid member for covering said opening part;
a through hole formed at said lid member wherethrough surgical instruments to be used in the thoracic cavity technique are insertable.

4. A thoracic cavity simulator as set forth in claim 3, wherein said lid member comprises a light transmitting material.

5. A thoracic cavity simulator as set forth in claim 1, further comprising at the ribs of said human skeleton model, a bone part corresponding to rib cartilage and being made of soft material allowing for a gap between neighboring ribs to be expanded.

6. A thoracic cavity simulator as set forth in claim 1, wherein said internal organ model comprises a human texture organ model, said human texture organ model being linearly expandable and being furnished with changeability of model size.

7. A thoracic cavity simulator as set forth in claim 1, wherein
   said organ model comprises a human texture organ model,
      said human texture organ model is furnished with tubes simulating blood vessels at the surface or the vicinity thereof; and
   wherein the thoracic cavity simulator also comprises a means for a liquid to flow out in a case wherein at least one of said tubes is broken.

8. A thoracic cavity simulator as set forth in claim 1, wherein said casing comprises a light transmitting material.

\* \* \* \* \*